Oct. 7, 1930.  E. L. WYLIE ET AL  1,777,344
ANTIRATTLE DEVICE FOR MOTOR VEHICLES
Filed Aug. 26, 1929
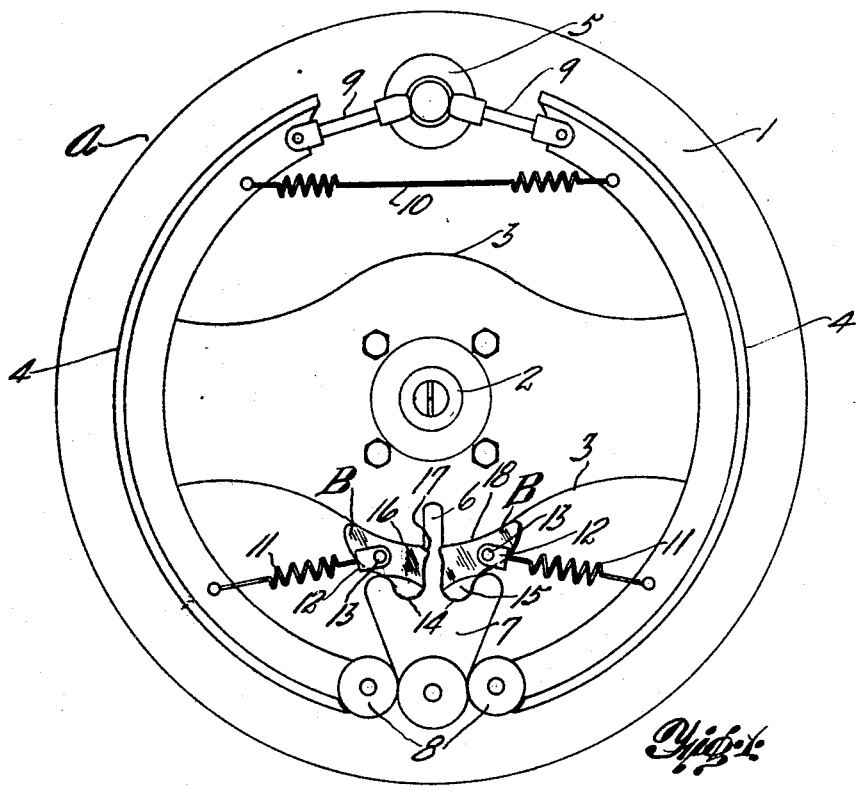
Fig. 1.
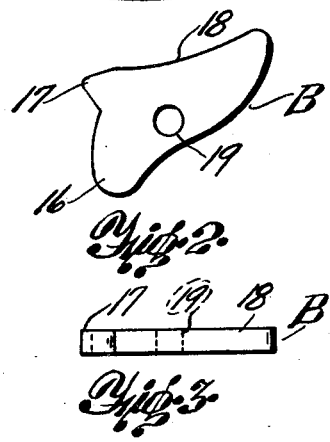
Fig. 2.
Fig. 3.
Inventors
Ernest L. Wylie
Edward H. Mohme
By Adam E. Fisher
Attorney Patented Oct. 7, 1930

1,777,344

UNITED STATES PATENT OFFICE

ERNEST L. WYLIE AND EDWARD H. MOHME, OF ST. LOUIS, MISSOURI

ANTIRATTLE DEVICE FOR MOTOR VEHICLES

Application filed August 26, 1929. Serial No. 388,297.

This invention relates to anti-rattle devices for motor vehicles and the main object is to provide a means for resiliently holding the brake operating wedge of a brake mechanism such as that used in the standard makes of cars from jarring or rattling as the car travels.

Another object is to provide a device for the above purpose which will not interfere in any way with the normal braking action of the brake mechanism so that no danger of causing the brake to become inoperative will be incurred in the use of the anti-rattle device thereon.

A further object is to provide an anti-rattle device of the foregoing characteristics which will be simple and cheap in manufacture, efficient in operation and readily applicable to the brake mechanism without changing the same in any way.

The foregoing and other objects together with means whereby the same may be carried into effect will best be understood from the following description of a preferred embodiment of the invention taken in connection with the accompanying drawing wherein:

Figure 1 is a side view of a brake mechanism with the wheel and its associated brake drum removed, showing the invention mounted in place thereon;

Figure 2 is a side view of one of the anti-rattle elements; and

Figure 3 is an edge view thereof.

Referring now more particularly to the drawing the reference character A denotes generally an expanding brake mechanism comprising a brake plate or flange 1 mounted on the axle of the motor vehicle here shown at 2. The plate 1 is bulged or shouldered outwardly above and below the axle 2 as denoted by 3. The brake shoes 4 are operated in a conventional manner by a cam (not shown) within the housing 5 which depresses a brake wedge pin 6 causing the brake wedge 7 to move downward between the brake rollers 8 and expanding the brake shoes. The said brake shoes 4 are conventionally connected to the links 9 at their upper ends and are normally drawn together by an upper brake spring 10 and the lower brake springs 11, the latter having end or eye pieces 12 adapted to be removably mounted over the brake spring studs 13 which are disposed below the bulge 3. It will be noted that the brake wedge 7 has spaced sockets or concaved recesses 14 formed at its upper side beside the pin 6, ribs 15 being extended medially across these recesses 14 from the outer margin of the wedge 7 to the pin 6 thus dividing each socket or recess 14 into two equal inner and outer parts as will be understood. The foregoing elements are of conventional structure and no invention is claimed therefor.

In carrying out the invention an anti-rattle element or cushion B is provided, the same being of some resilient or yielding material such as rubber, and as here shown, being provided with a curved nose portion 16, an angularly extended shoulder or corner 17 and a slightly concaved upper edge 18 as shown in Figure 2 of the drawing. An aperture 19 is also formed through the cushion B for a purpose to be described.

In applying the invention to the brake mechanism the end pieces 12 supporting the lower brake springs 11 are removed from the studs 13 and a cushion B is slipped over each of the studs, the apertures 19 in the cushion being for this purpose. The nose portion 16 of each cushion is entered into the inner sockets or recesses 14 in the brake wedge 7 inside the aforesaid ribs 15 and in this position the angular corners or shoulders 17 and concaved edges 18 of the cushions will bear against the brake wedge pin at each side and upon the underside of the lower bulged portion 3 of the plate 1 respectively as clearly shown in Figure 1. The cushions B are so formed that they are somewhat larger than the space into which they are to be entered and so must be forced in place whereupon their resiliency will effectually prevent up and down play of the wedge 7 or side to side play of the wedge pin 6 and eliminate any rattling of these parts. Since the cushions in the first instance are oversize they may wear away a considerable amount and yet fulfill their purpose thus lengthening the period in which they may be used. The end pieces 12 supporting the springs 11 are of course remounted on their studs 13 outside the cushions B and serve to hold the latter in place.

As hereinbefore pointed out the wedge 7 moves downwardly when expanding the shoes 4 to apply the brakes and since the cushions B are above the wedge they will of course have no effect upon this downward movement of the wedge. The cushions are made of sufficiently soft or yielding material so that they will allow the brake mechanism to freely resume its inoperative position after the brakes are released.

While we have herein set forth a certain preferred embodiment of the invention it is understood that we may vary from the same in minor structural details, not departing from the spirit of the invention and within the scope of the appended claims.

We claim:

1. In a brake mechanism including a movable brake wedge and brake wedge pin, the said brake wedge having spaced recesses on one side or edge at either side of the said pin, the said brake mechanism also having brake spring studs adjacent the said recesses of the brake wedge at either side of the brake wedge pin, elements provided with apertures for mounting upon the brake spring studs, the said elements having extended nose portions to engage the said recesses on the brake wedge and having angular shoulders to engage the brake wedge pin at each side.

2. In a brake mechanism including a brake plate, a vertically movable brake wedge and brake wedge pin, the said brake mechanism also having brake spring studs above the brake wedge and the said brake plate being bulged outwardly above these studs, yieldable cushions provided with apertures for mounting the cushions upon the brake spring studs, the said cushions having extended nose portions to engage the brake wedge and extended angular shoulders to engage the brake wedge pin upon its sides, the upper margin of the said cushions being adapted to fit under the said outward bulged portion of the brake plate.

3. In a device of the kind described, a resilient element having a brake wedge engaging nose portion, a brake wedge pin engaging shoulder and an aperture to receive a brake spring stud of a brake mechanism.

4. In a device of the kind described, a resilient element having an extended nose portion and an angularly formed shoulder, the said resilient element also having an aperture and having one edge concaved.

In testimony whereof we affix our signatures.

ERNEST L. WYLIE.
EDWARD H. MOHME.